United States Patent [19]

Mikroyannidis

[11] Patent Number: 4,536,565

[45] Date of Patent: Aug. 20, 1985

[54] FIRE-RESISTANT PHOSPHORUS CONTAINING POLYIMIDES AND COPOLYIMIDES

[75] Inventor: John A. Mikroyannidis, Patras, Greece

[73] Assignee: The United States of America as represented by the Administrator of the National Aeronautics and Space Administration, Washington, D.C.

[21] Appl. No.: 641,143

[22] Filed: Aug. 16, 1984

Related U.S. Application Data

[63] Continuation-in-part of Ser. No. 522,629, Aug. 12, 1983.

[51] Int. Cl.³ .............................................. C08G 73/10
[52] U.S. Cl. .................................... 528/352; 528/168; 528/229; 528/353
[58] Field of Search ................ 528/168, 229, 352, 353

[56] References Cited

U.S. PATENT DOCUMENTS 3,531,437  9/1970  Rio ....................................... 528/168
4,082,768  4/1978  Renner et al. ....................... 528/168
4,175,174  11/1979  Hermans ............................. 528/168

Primary Examiner—Lester L. Lee
Attorney, Agent, or Firm—Darrell G. Brekke; John R. Manning; Robert D. Marchant

[57] ABSTRACT

Phosphorus-containing polyimides and copolyimides are synthesized in a two-step polycondensation reaction from 1-[(diorganooxyphosphonyl)methyl]-2,4- and -2,6-diaminobenzenes and tetracarboxylic anhydride. The diorgano position of the diorganooxyphosphonyl group includes alkyl, such as ethyl, substituted alkyl, such as 2-chloroethyl, and aryl such as phenyl. The tetracarboxylic anhydrides include compounds such as pyromellitic dianhydride and benzophenone tetracarboxylic dianhydride. The glass transition temperature (Tg) of the polyimides is reduced by incorporation of the (dialkoxyphosphonyl)methyl groups. Both the molecular weight and the thermal stability of the polymers are reduced with increasing concentration of the phosphorus moieties. The phosphorus-containing copolyimides show a considerably higher degree of fire-resistance as compared to that of the corresponding common polyimides, and can be used in matrix composites in very thermally stable high temperature graphite composites for aircraft applications.

35 Claims, No Drawings

FIRE-RESISTANT PHOSPHORUS CONTAINING POLYIMIDES AND COPOLYIMIDES

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

RELATED APPLICATIONS

This application is a continuation-in-part of our copending application Ser. No. 522,629, filed Aug. 12, 1983, which is incorporated herein by reference. This application is also related to the following commonly assigned patent applications: U.S. Ser. No. 641,152, filed Aug. 16, 1984, which is directed to dinitrobenzene compounds of the formula:

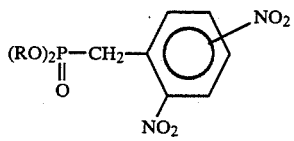

and the corresponding amines which are employed herein as monomers; U.S. Ser. No. 641,142, filed Aug. 16, 1984, which is directed to epoxy polymers prepared from the above diaminobenzenes; U.S. Ser. No. 641,153, filed Aug. 16, 1984, which is directed to polyimides and copolyimides prepared from the above diaminobenzenes; and U.S. Ser. No. 641,147, filed Aug. 16, 1984, which is directed to maleimido and citraconimido-substituted derivatives of the above diaminobenzenes.

BACKGROUND OF THE INVENTION

1. Field of the Invention

This invention relates to novel fire-resistant polyimides and copolyimides prepared from 1-[(diorganooxyphosphonyl)methyl]-2,4- and -2,6-diaminobenzenes. More particularly, it relates to phosphorus-containing polyimides prepared by a two-stage polycondensation reaction of 1-[(diorganooxyphosphonyl)methyl]-2,4- and -2,6-diaminobenzenes with a tetracarboxylic dianhydride, such as pyromellitic dianhydride and benzophenone tetracarboxylic dianhydride. In addition, it relates to phosphorus-containing copolyimides prepared by reacting 1-[(diorganooxyphosphonyl)methyl]-2,4- and -2,6-diaminobenzenes and a common diamine, such as m-phenylenediamine, with a tetracarboxylic dianhydride.

DESCRIPTION OF THE ART

The intrinsic thermal and oxidative stability of aromatic structures has long been recognized, and a variety of polyimides have been prepared in which benzene rings are linked together in chains or networks, as described in Cassidy, *Thermally Stable Polymers* (New York, Marcel Dekker, Inc., 1980), Chapter 5. In most cases, the connecting or pendant groups are less stable than the rings and the stability of the polyimides is largely determined by the nature of these groups.

Stabilization of the polyimides against combustion may be achieved by modification of their structure. This approach pertains to the synthesis of phosphorus- and/or halogen-containing monomers. The monomers are then polymerized or copolymerized at the desirable concentrations with common monomers.

Several investigations concerning preparation of fire-resistant polyimides have been recently reported. Polyimide foams having low flammability have been prepared by reacting a polyisocyanate with an aromatic tetracarboxylic dianhydride in the presence of furfuryl alcohol and a strong mineral acid, such as phosphoric acid, as described in Sawko et al., *Chem. Abstr.*, 91, 22063d (1979) and Tung et al., U.S. Pat. No. 4,263,410, issued April 1981, or using a metal octanoate catalyst, as described in Riccitiello et al., *Chem. Abstr.*, 90, 88254c (1979), and Riccitiello et al., U.S. Pat. No. 4,177,333, issued December 1979. Fire-resistant resin foams with predominantly cyclic imide structures also have been prepared from ethylenically unsaturated dicarboxylic acid anhydride and a polyisocyanate, as disclosed in Corbett et al., U.S. Pat. No. 4,110,274, issued August 1978. In addition, fire-resistant polyimides with phenoxaphosphine rings, as disclosed in Yokoyama, Japanese Pat. No. 81 57,827, May 1981, are based on tetrahalophthalic acid anhydrides, as disclosed in Korshak et al., U.S.S.R. Pat. No. 314,777, September 1971, have been reported.

There are a variety of polyimides containing different pendant groups disclosed in the art. Examples are disclosed in the following U.S. Pat. Nos.: 3,533,997, issued Oct. 13, 1970 to Angelo; 3,546,175, issued Dec. 8, 1970 to Angelo; 3,575,924, issued Apr. 20, 1971 to Bargain and 3,705,870, issued Dec. 12, 1972 to Darmory et al.

Some references of the inventors, which describe fire resistant compositions of phosphorus-containing polymers and the monomers thereof, include the following:

1. J. A. Mikroyannidis and D. A. Kourtides, "Fire-Resistant Compositions of Epoxy Resins with Phosphorus Compounds", Symposium on Rubber-Modified Thermoset Resins, 186th Annual American Chemical Society Meeting, Washington, D.C., Abstract PMSE 133, Aug. 28–Sept. 2, 1983;

2. J. A. Mikroyannidis and D. A. Kourtides, "Fire-Resistant Epoxy Resins Containing 1-(Di(2-Chloroethoxy phosphinyl)Methyl)-2,4- and 2,6 Diaminobenzene as Curing Agent", Proceedings of the 12th North American Thermal Analysis Society Conference, Williamsburg, VA (Sept. 1983);

3. J. A. Mikroyannidis and D. A. Kourtides, "Curing of Epoxy Resins with 1-[Di(2-Chloroethoxyphosphinyl)Methyl]-2,4- and 2,6-Diaminobenzene", *Journal of Applied Polymer Science*, Vol. 29, pp. 197–209, (1984);

4. J. A. Mikroyannidis and D. A. Kourtides, "Curing of Epoxy Resins with 1-[Di(2-Chloroethoxyphosphinyl)Methyl]-2,4- and 2,6-Diaminobenzene", National Aeronautics and Space Administration Report No. TM 84350, October 1983;

5. J. A. Mikroyannidis and D. A. Kourtides, "Synthesis and Characterization of Phosphorus-Containing Polyamides and Copolyamides based on 1-[Dialkoxyphosphinyl)Methyl]-2,4- and -2,6-Diaminobenzenes", *Journal of Applied Polymer Science*, Vol. 29, pp. 941–953 (1984);

6. J. A. Mikroyannidis and D. A. Kourtides, "Synthesis and Characterization of Phosphorus Containing Polyamides and Copolyamides Based on 1-[(Dialkoxyphosphinyl)Methyl]-2,4- and -2,6-Diaminobenzenes", Proceedings of the Society for the Advancement of Materials and Process Engineering, Reno, NV (April 1984); and 7. J. A. Mikroyannidis and D. A. Kourtides, "Curing of Epoxy Resins with 1-[Di(2-Chloroethoxyphosphinyl)Methyl]-2,4- and -2,6-Diaminobenzene", Proceedings of the Society of Plastics Industry Annual Spring Meeting, St. Louis, MO (May 1984).

However, these references of the inventors are not considered to be prior art concerning the present invention. Polyimides or copolyimides with pendant phosphorus-containing groups of the type described herein are apparently not known in the art.

SUMMARY OF THE INVENTION

Various novel phosphorus-containing polyimides in accordance with the invention may be prepared by reaction of 1-[(diorganooxyphosphonyl)methyl]-2,4- and -2,6-diaminobenzenes with a tetracarboxylic dianhydride, such as pyromellitic dianhydride and benzophenone tetracarboxylic dianhydride. In addition, copolyimides with various phosphorus contents may be prepared by reacting the above class of diaminobenzenes and a diamine, such as m-phenylenediamine, with a tetracarboxylic dianhydride. The novel phosphorus-containing polymers as compared to the corresponding common polymers show a considerably higher fire-resistance evaluated by determining their limiting oxygen index (LOI) value. Both the molecular weight and the thermal stability of the polymers is reduced with increasing concentration of the phosphorus moieties.

DETAILED DESCRIPTION OF THE INVENTION

The starting material for preparing the phosphorus-containing polyimides and copolyimides is a mixture of 1-[(diorganooxyphosphonyl)methyl]-2,4- and -2,6-diaminobenzenes 1.

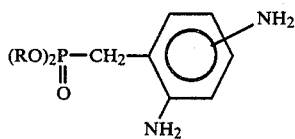

In this mixture as a consequence of the method of synthesis (see Examples 1 to 4 below) the 2,4-diamino isomer predominates. It is unnecessary for purposes of the present invention to separate the isomers. Compounds 1, although a mixture, will be referred to as a compound having the chemical structure of the predominant 2,4-diamino isomer. R may be an alkyl, substituted alkyl, or aryl group. Examples of R are methyl, ethyl, n- and iso-propyl, higher (e.g., C4 to C10) alkyl; haloalkyl, especially chloroalkyl, such as 2-chloroethyl; aromatic groups, such as phenyl, and the like. Ethyl and 2-chloroethyl groups are preferred, giving the following compounds:

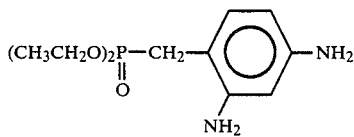

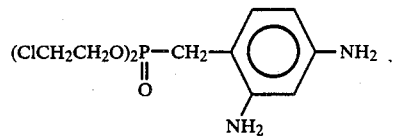

Diamines 1 may be prepared as described in our co-pending application U.S. Ser. No. 641,152 referred to above. Briefly stated, a [(diorganooxyphosphonyl)methyl]benzene, $(RO)_2P(O)CH_2C_6H_5$, is nitrated by a mixture of fuming nitric and sulfuric acid to the corresponding dinitro derivative, which is then reduced by catalytic hydrogenation to the diamino species 1. Examples 1 to 4 below illustrate this mode of synthesis. [(Diethoxyphosphonyl)methyl]benzene and [di(2-chloroethoxyphosphonyl)methyl]benzene, both of which are known compounds, are used as starting materials for preparing diamines 1a and 1b above, respectively.

The subject invention pertains to a novel class of phosphorus-containing polyimides prepared by reacting diamines 1 with a tetracarboxylic dianhydride, which has the following structure:

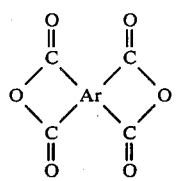

where Ar is independently in each case a tetravalent aromatic group containing from 6 to 20 carbon atoms. Therefore, examples of Ar include tetra-substituted phenyl, naphthalene, phenanthrene, benzophenone, benzosulfone and the like. In fused polycyclic structures, the tetra substitution may occur on the same ring but usually is on different rings. Preferred tetra-carboxylic dianhydrides include pyromellitic dianhydride and benzophenone tetracarboxylic dianhydride. The two-stage polycondensation reaction is as follows:

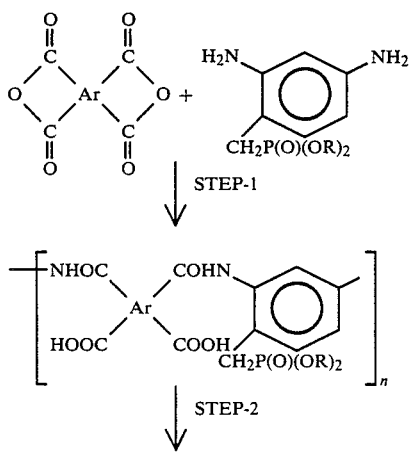

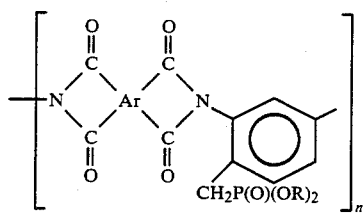

2a: Ar = 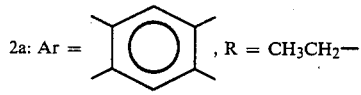, R = CH₃CH₂—

2b: Ar = 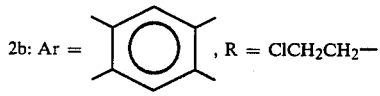, R = ClCH₂CH₂—

3a: Ar = 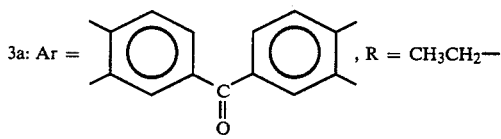, R = CH₃CH₂—

3b: Ar = 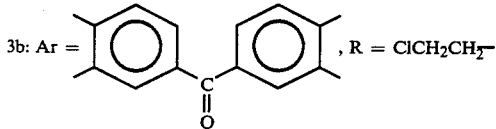, R = ClCH₂CH₂—

In the above two stage polycondensation having two components, Ar and R are as generally defined hereinabove. Preferred Ar embodiments include tetra substituted phenyl and tetra substituted benzophenone. Preferred R embodiments include ethyl and 2-chloroethyl. More preferred embodiments include the structures depicted by "2a", "2b", "3a" and "3b" immediately above. The subscript "n" is a positive integer. An embodiment of the present invention includes n between about 1 to 1000. A preferred embodiment is when n is between about 10 to 100.

The first stage (step 1) of the condensation results in a polyamide having free carboxyl groups as shown in the polymerization sequences above and also below. The second stage (step 2) results in the loss of water and formation of the polyimide in the polymerization sequences shown above and below. The polyamides obtained at the completion of step 1, described herein, are useful in ion exchange for the removal of ions (e.g., metal ions) from solutions. The polymers thus prepared will be referred to by the numbers shown above, and their synthesis is described in Example 5 to 8 below.

In addition, phosphorus-containing copolyimides with various phosphorus content may be prepared by reacting Compound 1 and a diamine, such as m-phenylenediamine, with a tetracarboxylic dianhydride as follows:

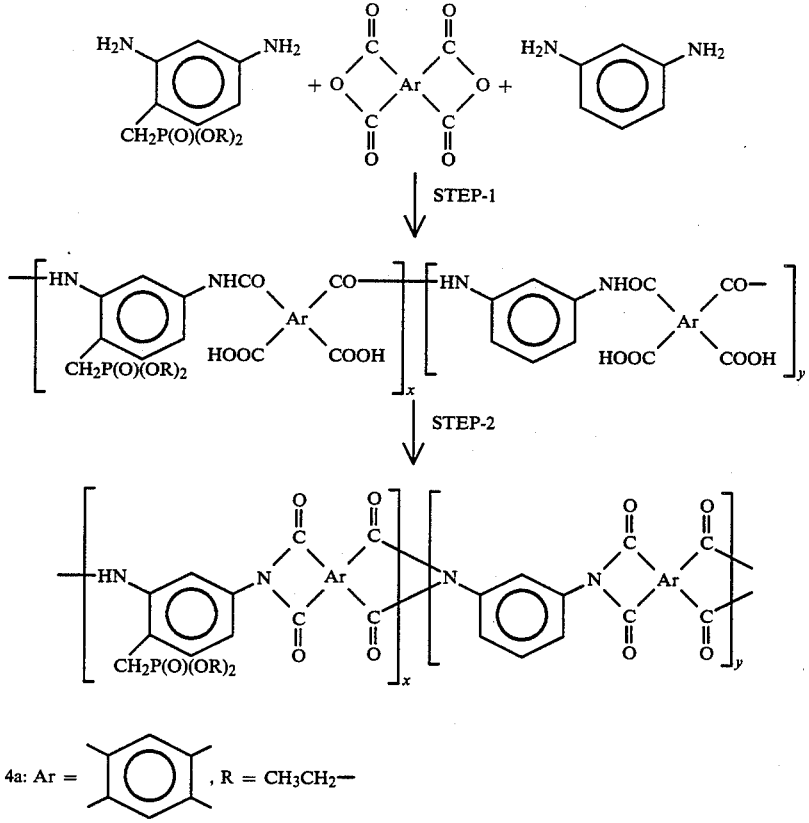

4b: Ar = 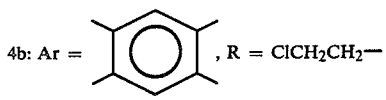, R = ClCH₂CH₂—

5a: Ar = 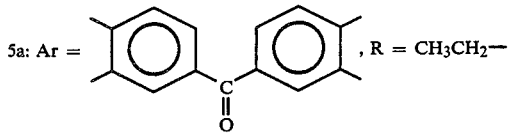, R = CH₃CH₂—

5b: Ar = 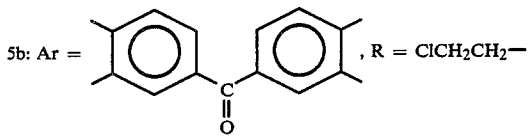, R = ClCH₂CH₂—

In the above two stage polycondensation having three reacting components, Ar and R are generally defined hereinabove. Preferred Ar embodiments include tetra substituted phenyl and tetra substituted benzophenone. Preferred R embodiments include ethyl and 2-chloroethyl. More preferred embodiments include the structures depicted by "4a", "4b", "5a" and "5b" immediately above. The additional component (H₂N—R'—NH₂) where R' is an optionally substituted aliphatic or aromatic group containing from 2 to 20 carbon atoms group, and is shown above as 1,3-phenylenediamine, may be any alkyl diamine, such as 1,6-adipodiamine, or aryl diamine, such as 2,4-diaminotoluene. The subscript "x" is a positive integer. An embodiment of the present invention includes "x" between about 1 and 1000. A preferred embodiment of the present invention includes "x" between about 10 and 100. The subscript "y" is a positive integer. An embodiment of the present invention includes "y" between about 1 and 1000. A preferred embodiment of the present invention includes "y" between about 10 and 100.

Copolyimides thus prepared containing approximately 3% phosphorus will be referred to by the numbers shown above, and their synthesis is described in Examples 9 to 12 below.

The polymerization may be carried out by a two-stage polycondensation method. The first stage of the condensation reaction is carried out in solution with a polar aprotic solvent, such as dimethylsulfoxide (DMSO). Other solvents, such as N,N-dimethyl formamide (DMF) and N,N-dimethyl acetamide (DMAC), may be used. The formation of polyamic acid is a fast exothermic reaction which is carried out at room temperature or slightly above (20°–50° C.). Under these conditions the extent of cyclodehydration is negligible. No noticeable change is observed in the inherent viscosities ($\eta_{inh}$) of the polyamic acid solutions when the solutions are protected from moisture. Inherent viscosity measurements show that the molecular weight of polyimides is reduced as the concentration of the phosphorus moieties increases.

Dehydration, the second stage of the imidization process, can be carried out by thermal or chemical means. After removing the solvent at 75° C., the thermal process involves heating of the polymer at about 280° C. in a vacuum for two hours. The chemical means include azeotroping the water of cyclization with benzene or refluxing in acetic anhydride with pyridine as a catalyst. Cyclization by stirring at room temperature in the presence of acetic anhydride-pyridine is preferred. Completion of the reaction is ensured by heating of the polymers precipitated at 200° C. in a vacuum oven for two hours.

These polyimides and copolyimides are flame and fire-resistant and can be used in matrix composites in very thermally stable high temperature graphite composites for aircraft applications.

The following examples illustrate the preparation methods of the starting materials (Examples 1 to 4) as well as of the phosphorus-containing polyimides (Examples 5 to 8) and copolyimides (Examples 9 to 12). The examples are to be considered as illustrative and not as limiting the scope of the present invention.

In the examples, the reactants employed were obtained as follows.

Pyromellitic dianhydride and benzophenone tetracarboxylic dianhydride were purified by recrystallization from acetic anhydride. Analytical grade m-phenylenediamine was used for preparation of copolyimides. Dimethyl sulfoxide was dried by refluxing and fractionally distilled from calcium hydride.

All inherent viscosity ($\eta_{inh}$) values of polyamic acids are given in dimethyl sulfoxide (0.5% concentration at 25° C.).

EXAMPLE 1

1-[(Diethoxyphosphonyl)methyl]-2,4- and -2,6-dinitrobenzenes

[(Diethoxyphosphonyl)methyl]benzene (21.76 g, 95 mmol) was added dropwise to a mixture of fuming nitric acid (16.3 g) and fuming sulphuric acid (54.30 g), containing 30% $SO_3$, at 55° C. The addition of the phosphonate lasted 1 hour and subsequently the mixture was heated at the same temperature for another hour. The mixture was poured into 1 liter of ice water and extracted with chloroform (300 ml). The chloroform solution as washed with 5% sodium bicarbonate solution and with water, dried ($Na_2SO_4$) and concentrated to give a yellowish solid (24.16 g, 80%, mp 78°–82° C.). Recrystallizations from ether-chloroform (10:1 vol/vol) gave an analytical sample: mp 101°–104° C. Elemental analysis showed the following results: C=41.60%, H=4.92%, N=8.69%.. The values calculated for formula $C_{11}H_{15}N_2O_7P$ are C=41.52%, H=4.75%, N=8.80%.

EXAMPLE 2

1-[(Diethoxyphosphonyl)methyl]-2,4- and 2,6-diaminobenzenes Ia

The recrystallized product of Example 1 (2.00 g, 6.28 mmol) was dissolved in 50 ml of absolute ethanol and a small amount of catalyst, 10% palladium on carbon, was added. The hydrogenation was carried out on a Parr apparatus under a pressure of 3.5 atm at room temperature until no more hydrogen was taken up (about 3 hrs). After the filtration of the catalyst and the removal of the volatile components under vacuum, a viscous undistillable liquid was obtained (1.57 g, 97%), which could not be induced to crystallize.

The dihydrochloride salt was formed by passing anhydrous hydrochloride gas through its solution in chloroform. This salt was a nearly white solid and after recrystallization from ethanol-ether (1:6 vol/vol) an analytical sample was obtained which was decomposed at temperature higher than 128° C. Elemental analysis of the dihydrochloride salt of 2a showed the following results: C=39.25%, H=6.21%, N=8.35%. The values calculated for formula $C_{11}H_{21}Cl_2N_2O_3P$ are C=39.89%, H=6.39%, N=8.46%.

EXAMPLE 3

1-[(Di-2-chloroethoxyphosphonyl)methyl]-2,4- and -2,6-dinitrobenzenes

1-[(Di-2-chloroethoxyphosphonyl)methyl]benzene (5.13 g, 17 mmol) was added dropwise to a mixture of fuming nitric acid (4.0 g) and fuming sulphuric acid (13.0 g), containing 30% $SO_3$ at 55° C. The addition of the phosphonate lasted 0.5 hour and subsequently the mixture was heated at the same temperature for 4 hours longer. The mixture was poured into 300 ml of ice water and extracted with chloroform (150 ml). The chloroform solution was washed with 5% sodium bicarbonate solution and with water, dried ($Na_2SO_4$) and concentrated to give a viscous liquid (4.92 g) diluted with about 100 ml of acetone-ether (1:10 vol/vol). Upon cooling of the solution the dinitrobenzene was crystallized (2.80 g, 42%, mp 79°–84° C.). Recrystallizations from acetone-ether (1:10 vol/vol) gave an analytical sample: mp 83°–85° C. Elemental analysis showed the following results: C=34.22%, H=3.45%, N=7.12%. The values calculated for formula $C_{11}H_{13}Cl_2N_2O_7P$ are C=34.13%, H=3.39%, N=7.24%.

EXAMPLE 4

1-[(Di-2-chloroethoxyphosphonyl)methyl]-2,4- and -2,6-diaminobenzenes, Ib

Recrystallized product of Example 3 (2.27 g, 58.6 mmol) was dissolved in 40 ml of absolute ethanol and a small amount of catalyst, 10% palladium on carbon, was added. The hydrogenation was carried out as in Example 2. A solid product was obtained (1.88 g, 98%, mp 105°–109° C.). Recrystallizations from benzene gave an analytical sample: mp 116°–119° C. Elemental analysis showed the following results: C=40.52%, H=5.39%, N=8.25%. The values calculated for formula $C_{11}H_{17}Cl_2N_2O_3P$ are C=40.38%, H=5.24%, N=8.56%.

EXAMPLE 5

Polyimide 2a

Diamine 1a (2.158 g, 9.75 mmol) was placed in a three-necked flask that contained 50 ml of dry dimethyl sulfoxide and fitted with a nitrogen inlet and a calcium chloride drying tube. Dry nitrogen gas was bubbled through a clear solution and a magnetic stirring bar was used to mix the solution. To the vigorously stirred solution, pyromellitic dianhydride (2.126 g, 9.75 mmol) was added in portions. Stirring was continued for 5 hours in a stream of nitrogen. The polyamic acid had a $\eta_{inh}$ value of 0.15 dl/g and can be precipitated from the solution with toluene. Cyclodehydration (stage 2) was carried out by adding pyridine and acetic anhydride (1:1). The mixture was stirred at room temperature for 24 hours and then poured into water. The precipitate was filtered, washed with methanol and heated in a vacuum oven at 200° C. for 2 hours (3.89 g, yield 91%). Elemental analysis showed the following results: C=56.85%, H=4.05%, N=6.26%, P=6.59%. The values calculated for formula $C_{21}H_{17}N_2O_7P$ are C=57.29%, H=3.86%, N=6.37%, P=7.04%.

EXAMPLE 6

Polyimide 2b

Diamine 1b (1.635 g, 5.00 mmol) reacted with pyromellitic dianhydride (1.091 g, 5.00 mmol) in 25 ml of dimethyl sulfoxide as in Example 5. The resulting polyamic acid had a $\eta_{inh}$ value of 0.10 dl/g. Polyimide 2b was obtained in a yield of 88% (2.24 g). Elemental analysis showed the following results: C=49.86%, H=3.17%, N=5.88%, P=6.37%. The values calculated for formula $C_{21}H_{15}Cl_2N_2O_7P$ are C=49.54%, H=2.95%, N=5.50%, P=6.08%.

EXAMPLE 7

Polyimide 3a

Diamine 1a (3.000 g, 11.62 mmol) dissolved in 70 ml of dimethyl sulfoxide reacted with benzophenone tetracarboxylic dianhydride (3.743 g, 11.62 mmol) as in Example 5. The $\eta_{inh}$ value of polyamic acid was 0.11 dl/g. Polyimide 3a was obtained in a yield of 92% (5.83 g). Elemental analysis showed the following results: C=61.16%, H=3.92%, N=4.96%, P=5.42%. The values calculated for formula $C_{28}H_{21}N_2O_8P$ are C=61.78%, H=3.86%, N=5.15%, P=5.69%.

EXAMPLE 8

Polyimide 3b

Utilizing the same procedure, diamine 1b (1.635 g, 5.00 mmol) reacted with benzophenone tetracarboxylic dianhydride (1.611 g, 5.00 mmol) in 30 ml of dimethyl sulfoxide. Polyamic acid had a $\eta_{inh}$ value of 0.14 dl/g. The yield of polyimide 3b was 87% (2.67 g). Elemental analysis showed the following results: C=56.18%, H=3.34%, N=4.92%, P=5.17%. The values calculated for formula $C_{28}H_{19}Cl_2N_2O_8P$ are C=54.84%, H=3.10%, N=4.57%, P=5.05%.

EXAMPLE 9

Copolyimide 4a

A three-necked flask equipped with a nitrogen inlet and a calcium chloride drying tube was charged with 3.290 g (12.74 mmol) of 1a, m-phenylenediamine (2.502 g, 23.14 mmol) and 185 ml of dry dimethyl sulfoxide. Dry nitrogen was bubbled through the solution. To the vigorously stirred solution pyromellitic dianhydride (7.826 g, 35.88 mmol) was added portionwise. The $\eta_{inh}$ value of copolyamic acid was 0.36 dl/g. Cyclodehydration was carried out by adding a solution of pyridine-acetic anhydride-toluene (1:1:1). After stirring at room temperature for 24 hours, the polymer precipitated was filtered, washed with acetone and heated in a vacuum oven at 200° C. for 2 hours. Copolyimide 4a was obtained in a yield of 93% (11.47 g). Elemental analysis showed that it contained 2.93% P. The value calculated is 3.20% P.

EXAMPLE 10

Copolyimide 4b

A mixture of diamine 1b (3.193 g, 9.76 mmol) and m-phenylenediamine (1.668 g, 15.43 mmol) dissolved in 130 ml of dimethyl sulfoxide reacted with pyromellitic dianhydride (5.496 g, 25.19 mmol) as in Example 9. Copolyamic acid had a $\eta_{inh}$ value of 0.30 dl/g. The yield of copolyimide 4b was 92% (8.70 g). Elemental analysis showed that it contained 3.06% P. The value calculated is 3.20% P.

EXAMPLE 11

Copolyimide 5a prepared by reacting m-phenylenediamine with a tetracarboxylic dianhydride.

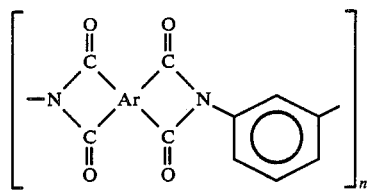

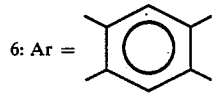

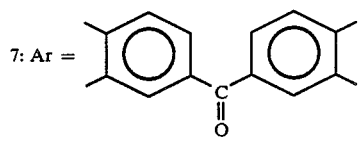

TABLE 1

| | Thermal Properties of Polyimides | | | | | | |
|---|---|---|---|---|---|---|---|
| | In nitrogen | | | In air | | | |
| Polymer | PDT (°C.) | PDTmax (°C.) | Char yield (%, 700° C.) | Char yield (%, 700° C.) | Weight loss (%)* | Phosphorus (%) | LOI |
| 2a | 453 | 620 | 54 | 16 | 7.6 | | |
| 2b | 401 | 572 | 70 | 63 | 5.4 | | |
| 4a | 529 | 619 | 61 | 34 | 2.2 | 2.93 | 52.3 |
| 4b | 512 | 614 | 66 | 37 | 2.6 | 3.03 | 68.5 |
| 6 | 600 | 646 | 58 | 7 | 0.6 | 0 | 39.6 |
| 3a | 350 | 580 | 64 | 22 | 6.8 | | |
| 3b | 412 | 632 | 56 | 5 | 6.6 | | |
| 5a | 497 | 617 | 65 | 13 | 2.4 | 2.92 | 56.9 |
| 5b | 520 | 644 | 58 | 4 | 1.6 | 3.27 | 57.2 |
| 7 | 564 | 631 | 63 | 1 | 0.6 | 0 | 43.9 |

*Isothermal weight loss at 260° C. in $N_2$ atmosphere after 1 hr

A mixture of diamine 1a (3.190 g, 12.35 mmol) and m-phenylenediamine (1.429 g, 13.22 mmol) dissolved in 150 ml of dimethyl sulfoxide reacted with benzophenone tetracarboxylic dianhydride (8.239 g, 25.57 mmol) according to the procedure described in Example 9. The $\eta_{inh}$ value of copolyamic acid was 0.21 dl/g. Copolyimide 5a was obtained in a yield of 89% (10.64 g). Elemental analysis showed that it contained 2.92% P. The value calculated is 3.20% P.

EXAMPLE 12

Copolyimide 5b

Utilizing the same procedure a mixture of diamine 1b (2.997 g, 9.16 mmol) and m-phenylenediamine (0.889 g, 8.22 mmol) dissolved in 100 ml of dimethyl sulfoxide reacted with benzophenone tetracarboxylic acid had a $\eta_{inh}$ value of 0.31 dl/g. The yield of copolyimide 5b was 82% (7.27 g). Elemental analysis showed that it contained 3.27% P. The value calculated is 3.20%.

THERMAL PROPERTIES OF POLYMERS

The phosphorus-containing polyimides and copolyimides, the synthesis of which is described in the preceding examples, were thermally characterized by differential scanning calorimetry (DSC) and thermogravimetric analysis (TGA). Their thermal properties were compared with those of the following common polyimides Polyimides 6 and 7 have a $\eta_{inh}$ value of 0.70 and 0.39 dl/g, respectively.

The glass transition temperature of some polyimides was determined from their DSC thermograms. The results are as follows: 4b, 346° C.; 6, 412° C.; 3a, 218° C.; 5b, 280° C.; 7; 307° C. From these results it will be seen that the polymers of pyromellitic dianhydride had a considerably higher Tg value than the corresponding polyimides of benzophenone tetracarboxylic dianhydride. In addition, the Tg value of the polymers was reduced when the (dialkoxyphosphonyl)methyl group in their molecule was introduced.

Some TGA data and thermal characteristics of polyimides are shown in Table 1. In this table, PDT is the polymer decomposition temperature, PDTmax is the maximum polymer decomposition temperature and LOI is the limiting oxygen index determined according to the ASTM D 2863-74 method. From this table it will be seen that the phosphorus-containing polyimides and copolyimides show a lower thermal stability and a significantly higher fire-resistance than the corresponding common polyimides.

It should be readily apparent to those skilled in the art that various changes in form and detail of the invention as shown and described may be made. It is intended that such changes be included within the spirit and scope of the claims appended hereto.

What is claimed is:

1. A polymer having the formula:

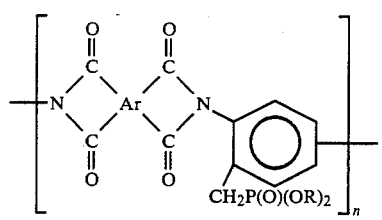

wherein Ar is a tetravalent aromatic group containing from 6 to 20 carbon atoms selected from among phenyls, naphthalenes, phenanthrenes, benzophenones and benzosulfones, R is an alkyl, haloalkyl or aryl group, n is a positive integer, and the linkage of the group:

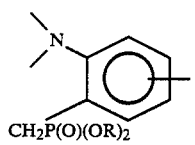

is in a 4-position or a 6-position relative to the (phosphonyl)methyl group.

2. The polymer of claim 1 wherein R is an ethyl or 2-chloroethyl group.

3. The polymer of claim 1 in which Ar is

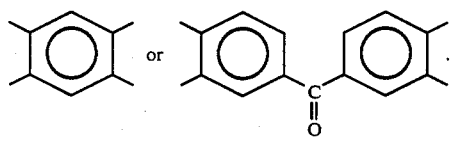

4. A polymer having the formula:

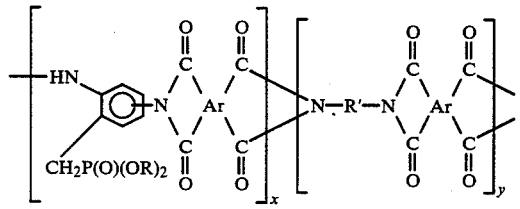

wherein Ar is, independently in each case, a tetravalent aromatic group containing from 6 to 20 carbon atoms selected from among phenyls, naphthalenes, phenanthrenes, benzophenones and benzosulfones, R is an alkyl, haloalkyl or aryl group, R' is an aliphatic or aromatic hydrocarbon group containing from 2 to 20 carbon atoms, x and y are independently positive integers, and the linkage of the group:

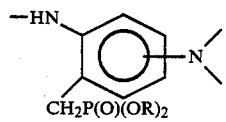

is in a 4-position or a 6-position relative to the (phosphonyl)methyl group.

5. The polymer of claim 4 wherein R is an ethyl or 2-chloroethyl group.

6. The polymer of claim 4 in which Ar is

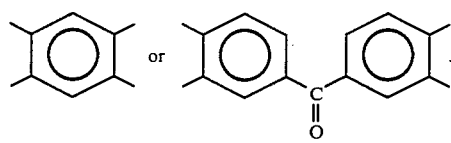

7. The polymer of claim 4 in which R' is

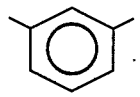

8. A method of producing a polymer having the formula:

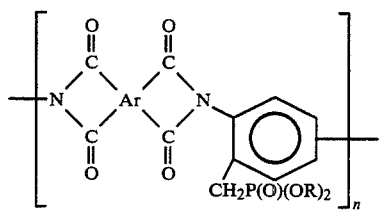

wherein:
Ar is, independently in each case, a tetravalent aromatic group containing from 6 to 20 carbon atoms selected from among phenyls, naphthalenes, phenanthrenes, benzophenones and benzosulfones;
R is an alkyl, haloalkyl or aryl group;
n is a positive integer; and the linkage of the group:

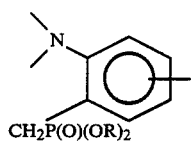

is in a 4-position or 6-position relative to the (phosphonyl)methyl group, which method comprises:
(a) reacting at 20° C. to 50° C. a (phosphonyl)methyl diaminobenzene of the formula

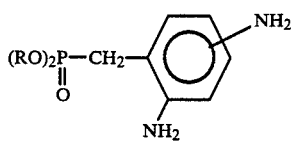

wherein R is as described herein with a substantially equimolar amount of a compound of the formula:

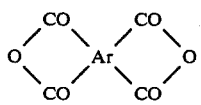

wherein Ar is as defined herein, in a polar aprotic solvent to form an intermediate of the formula:

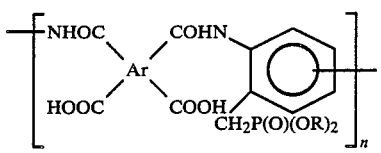

wherein Ar, R and n defined hereinabove; and
(b) dehydrating said intermediate of step (a) by thermal or chemical means or a combination thereof.

9. The method of claim 8 wherein Ar is tetravalent phenyl.

10. The method of claim 9 wherein R is ethyl.

11. The method of claim 8 wherein R is ethyl.

12. The method of claim 8 wherein R is 2-chloroethyl.

13. The method of claim 9 wherein R is 2-chloroethyl.

14. A method of producing a polymer having the formula:

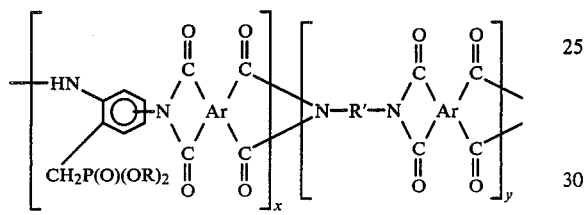

wherein:
Ar is a tetravalent aromatic group containing from 6 to 20 carbon atoms selected from among phenyls, naphthalenes, phenanthrenes, benzophenones and benzosulfones;
R is an alkyl, haloalkyl or aryl group;
R' is an aliphatic or aromatic group containing from 2 to 20 carbon atoms;
x and y are independently positive integers; and the linkage of the group:

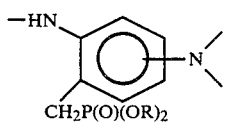

is in a 4-position or a 6-position relative to the (phosphonyl)methyl group which process comprises:
(a) reacting at 20° C. to 50° C. a mixture which itself contains:
(i) a (phosphonyl)methyl diaminobenzene of the formula

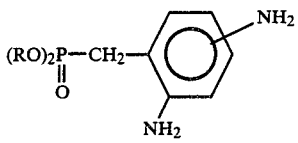

wherein R is as defined herein;
(ii) an aryl tetracarboxylic dianhydride of the formula:

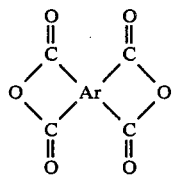

wherein Ar is as defined herein; and
(iii) a diamine of the formula:

$H_2N-R'-NH_2$ wherein R' is as defined herein with the number of equivalents of anhydride in the dianhydride (ii) being substantially equal to the number of equivalents of amine in amines (i) plus (iii); in a polar aprotic dipolar solvent to produce an intermediate of the formula:

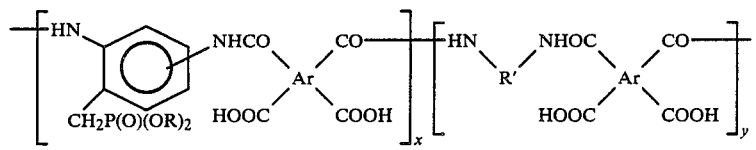

wherein Ar, R, R', x and y are as defined herein; and
(b) dehydrating the said intermediate of step (a) by thermal or chemical means or a combination thereof.

15. The method of claim 14 wherein Ar is a tetravalent phenyl group.

16. The method of claim 14 wherein R is an ethyl or 2-chloroethyl group.

17. The method of claim 16 wherein Ar is a tetravalent phenyl group.

18. A method of producing a polymer having the formula:

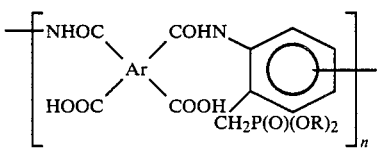

wherein:
Ar is, independently in each case, a tetravalent aromatic group containing from 6 to 20 carbon atoms selected from among phenyls, naphthalenes, phenanthrenes, benzophenones and benzosulfones;
R is an alkyl, haloalkyl or aryl group;
n is a positive integer; and the linkage of the group:

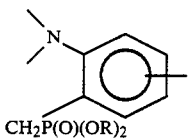

is in a 4-position or 6-position relative to the (phosphonyl)methyl group, which method comprises:
(a) reacting at 20° C. to 50° C. a (phosphonyl)methyl diaminobenzene of the formula

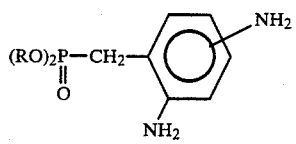

wherein R is as described herein with a sustantially equimolar amount of a compound of the formula:

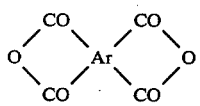

wherein Ar is as defined herein,
in a polar aprotic solvent; and thereafter
(b) recovering said polymer.

19. The method of claim 18 wherein said linkage of the amine groups is predominantly in the 2 and 4 positions.

20. The method of claim 19 wherein R is ethyl or 2-chloroethyl.

21. The method of claim 19 wherein Ar is tetravalent phenyl.

22. A method of producing a polymer having the formula:

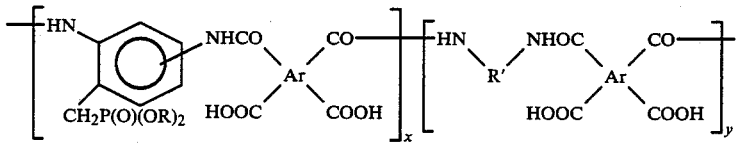

wherein:
Ar is a tetravalent aromatic group containing from 6 to 20 carbon atoms selected from among phenyls, naphthalenes, phenanthrenes, benzophenones and benzosulfones;
R is an alkyl, haloalkyl or aryl group;
R' is an aliphatic or aromatic group containing from 2 to 20 carbon atoms;
x and y are independently positive integers; and the linkage of the group:

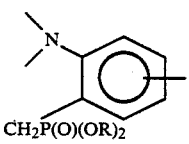

is in a 4-position or a 6-position relative to the (phosphonyl)methyl group which process comprises:
(a) reacting at 20° C. to 50° C. a mixture which itself contains:
(i) a (phosphonyl)methyl diaminobenzene of the formula

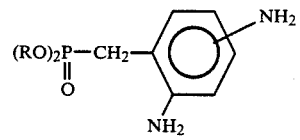

wherein R is as defined herein;
(ii) an aryl tetracarboxylic dianhydride of the formula:

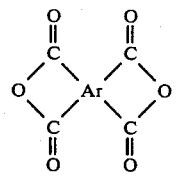

wherein Ar is as defined herein; and
(iii) a diamine of the formula:

$H_2N-R'-NH_2$ wherein R' is as defined herein with the number of equivalents of anhydride in the dianhydride (ii) being substantially equal to the number of equivalents of amine in amines (i) plus (iii);
in a polar aprotic dipolar solvent; and thereafter
(b) recovering said polymer.

23. The method of claim 22 wherein said linkage of the amine groups is predominantly in the 2 and 4 positions.

24. The method of claim 23 wherein R is ethyl or 2-chloroethyl.

25. The method of claim 23 wherein Ar is tetravalent phenyl.

26. The method of claim 23 wherein R' is phenyl substituted in the 1 and 3 positions.

27. A polymer having the formula:

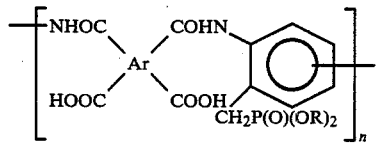

wherein Ar is a tetravalent aromatic group containing from 6 to 20 carbon atoms selected from among phenyls, naphthalenes, phenanthrenes, benzophenones and benzosulfones, R is an alkyl, haloalkyl or aryl group, n is a positive integer, and the linkage of the group:

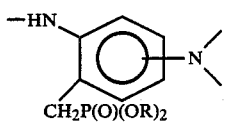

is in a 4-position or a 6-position relative to the (phosphonyl)methyl group.

28. The polymer of claim 27 wherein said linkage of the amine group is predominantly in the 2 and 4 positions.

29. The product of claim 28 wherein R is ethyl or 2-chloroethyl.

30. The product of claim 28 wherein Ar is tetravalent phenyl.

31. A polymer having the formula:

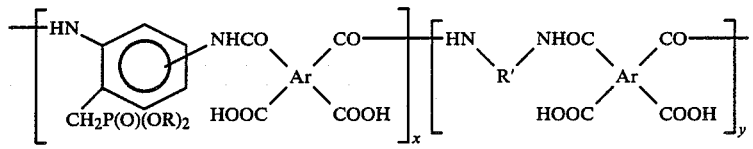

wherein Ar is, independently in each case, a tetravalent aromatic group containing from 6 to 20 carbon atoms selected from among phenyls, naphthalenes, phenanthrenes, benzophenones and benzosulfones, R is an alkyl, haloalkyl or aryl group, R' is an aliphatic or aromatic hydrocarbon group containing from 2 to 20 carbon atoms, x and y are independently positive integers, and the linkage of the group:

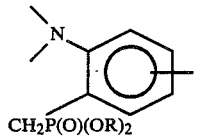

is in a 4-position or a 6-position relative to the (phosphonyl)methyl group.

32. The polymer of claim 31 wherein said linkage of the amine groups is predominantly in the 2 and 4 positions.

33. The polymer of claim 31 wherein R is ethyl or 2-chloroethyl.

34. The polymer of claim 31 wherein Ar is tetravalent phenyl.

35. The polymer of claim 31 wherein R' is phenyl substituted in the 1 and 3 positions.

* * * * *